June 5, 1956 G. R. DUNCAN Re. 24,162

VACUUM CONTAINER MILKING SYSTEM AND APPARATUS THEREFOR

Original Filed Sept. 26, 1952 4 Sheets-Sheet 1

INVENTOR
GEORGE R. DUNCAN

BY Raber, Reese & Sheridan

ATTORNEY

June 5, 1956 G. R. DUNCAN Re. 24,162
VACUUM CONTAINER MILKING SYSTEM AND APPARATUS THEREFOR
Original Filed Sept. 26, 1952 4 Sheets-Sheet 2
FIG. 2.
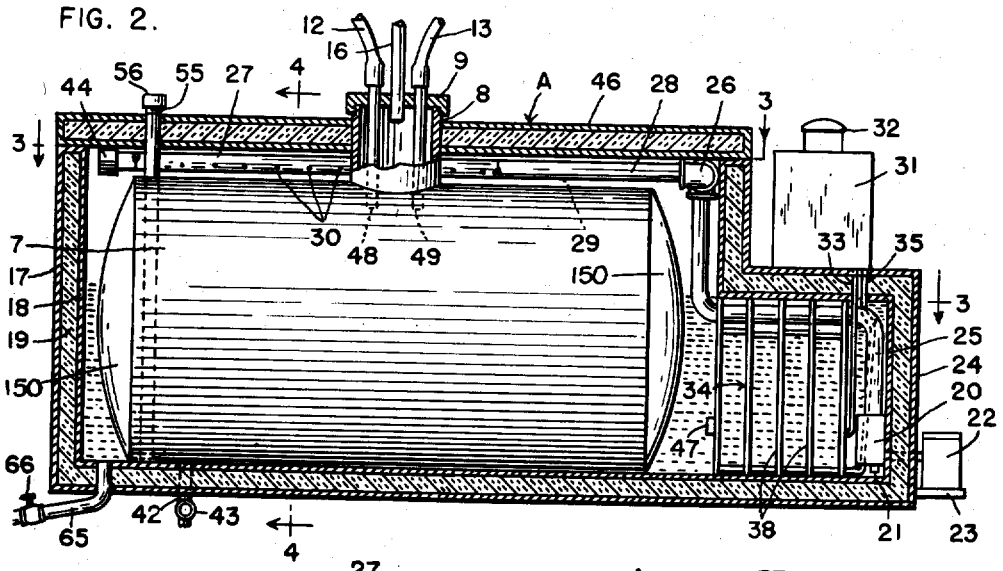
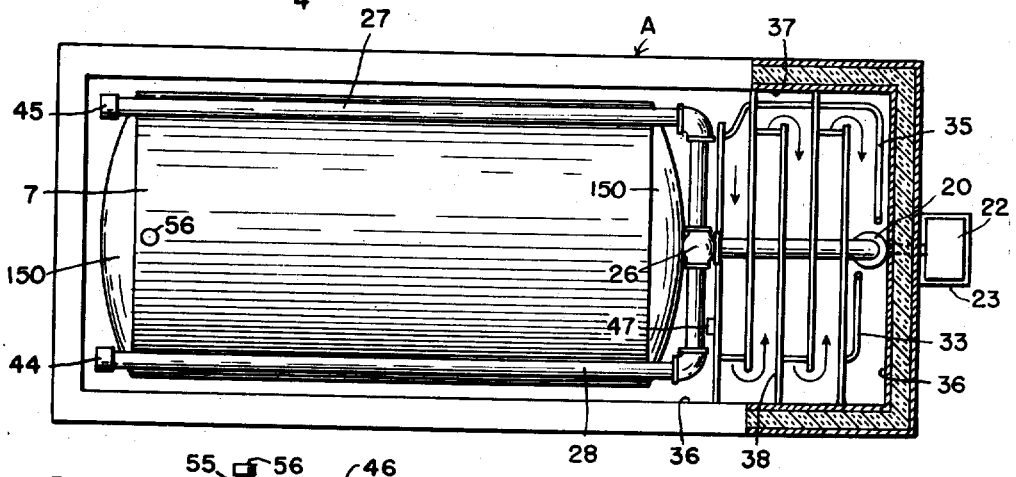
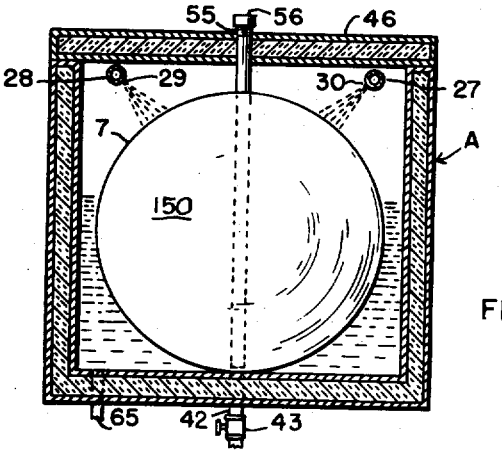
FIG. 3.
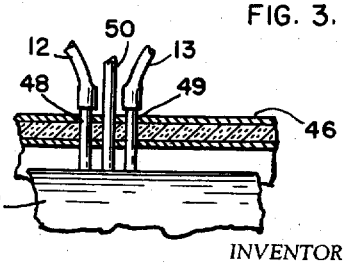
FIG. 5.
FIG. 4.
INVENTOR
GEORGE R. DUNCAN
BY Mason, Mason & Sheridan
ATTORNEY

VACUUM CONTAINER MILKING SYSTEM AND APPARATUS THEREFOR

Original Filed Sept. 26, 1952 4 Sheets-Sheet 3

INVENTOR
GEORGE R. DUNCAN

BY Bacon, Perry & Sheridan
ATTORNEY

VACUUM CONTAINER MILKING SYSTEM AND APPARATUS THEREFOR

Original Filed Sept. 26, 1952 4 Sheets-Sheet 4

INVENTOR
GEORGE R. DUNCAN

BY Mason, Mason & Shoreday
ATTORNEYS

United States Patent Office

Re. 24,162
Reissued June 5, 1956

24,162

VACUUM CONTAINER MILKING SYSTEM AND APPARATUS THEREFOR

George R. Duncan, Washington, Mo., assignor to Zero Manufacturing Company, Washington, Mo.

Original No. 2,702,019, dated February 15, 1955, Serial No. 311,771, September 26, 1952. Application for reissue January 10, 1956, Serial No. 558,400

18 Claims. (Cl. 119—14.09)

Matter enclosed in heavy brackets [ ] appears in the original patent but forms no part of this reissue specification; matter printed in italics indicates the additions made by reissue.

This application relates to a milking system for milking one or more cows and for causing the milk to flow into a container within a refrigerator or other milk cooler.

An object of the invention is to provide a milking system wherein the milk is drawn from the animals by means of minus pressure and is deposited by said pressure within a receptacle.

An additional object of the invention is to provide a system for handling milk whereby the milk is untouched by human hands and is fed directly from the farm animals to a receptacle from whence it may be withdrawn to a milk tank or truck. The milk may be withdrawn from the milk receptacle to the truck by means of a hose connection from the truck to the milk receptacle by the suction means on the truck.

An additional object of the invention is to provide a system of the above type in which a receptacle within a refrigerator is cooled exteriorly as the receptacle is filled with milk, so as to maintain the milk in the receptacle below a maximum number of degrees, say 40° F.

A further object of the invention is to provide means for cooling milk in bulk within a receptacle which is fixed within a refrigerator or other milk cooler.

Other objects will appear hereinafter throughout the specification.

In the drawings:

Figure 2 is a vertical section of the cooler, with the milk receptacle and certain parts of the pipe system shown in full lines;

Figure 3 is a horizontal section taken on the line 3—3 of Figure 2;

Figure 4 is a vertical section taken on the line 4—4 of Figure 2, with the milk receptacle shown in full lines;

Figure 5 is a partial vertical section showing a portion of the receptacle in broken lines of a modified form of the invention;

Figure 1:
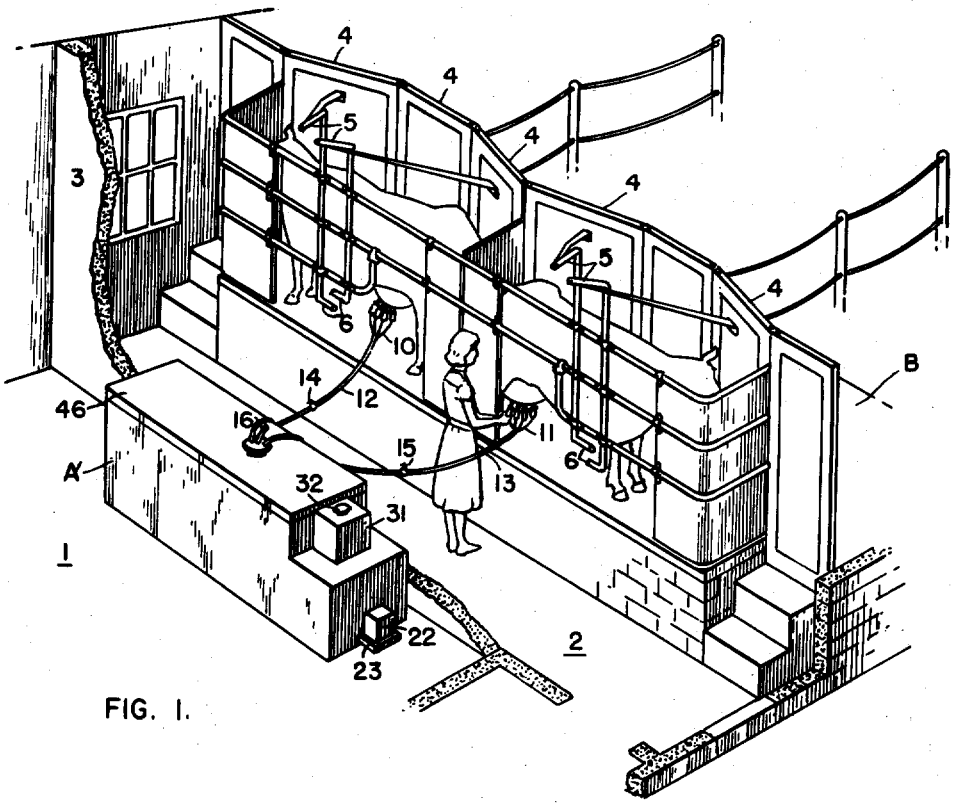
Figure 1 is a perspective view of the system in operation with part of one separating wall broken away.

The present invention is an improvement on the structure shown in several of my prior issued patents, including Patents Nos. 2,470,979; 2,482,579; 2,498,401; and other patents and pending applications.

Referring to the drawings, as shown in the several figures, the letter A indicates a refrigerator or milk cooler and B, a pair of raised milking platforms forming cow feeding and milking stalls.

Referring particularly to Figure 1 which shows a layout suitable for use with the present system, 1 is a space forming part of a milking parlor, preferably separated from a milker's aisle 2 by a partition or wall 3. The cooler is preferably located in the milking parlor adjacent to partition 3 as shown.

The animals are admitted to their respective milking stalls, and led out of the same via ramps (not shown). Access to and from each of the stalls is through pairs of pivoted doors 4 which are controlled by levers 5 by means of handles 6.

Located within the refrigerator or cooling cabinet A is a bulk receptacle 7 preferably constructed of stainless steel, aluminum, or other non-rustable metal, having a neck portion 8 and a cover 9 therefor. The cover is provided with means (not shown) whereby it may be hermetically sealed to the neck portion, in a manner similar to the covers 50 and 75 of Figures 3 and 4 of my Patent No. 2,498,401.

The numerals 10 and 11 indicate two sets of teat cups which are connected to conduits 12 and 13, having valves 14 and 15 respectively. These milk lines or conduits 12 and 13 extend through a window (not shown) in wall 3 and through the cover 9. These conduits may be provided with sealing means similar to sealing means shown in Figure 3 of my Patent No. 2,498,401, except that one of said sealing means will be provided for each milk conduit.

The numeral 16 indicates a vacuum line or conduit which is preferably connected to a source of minus pressure (not shown). This conduit will also be provided with the usual sealing means, such as a gasket (not shown) where it passes through the cap 9.

It will be noted by reference to Figure 1 that due to the elevated position of the cows and the lower position of the milk receptacle in the refrigerator, [that] the milk flows to the container partly by gravity and with a minimum of minus pressure applied by the pulsator or vacuum or other milking system to which the line is connected.

Preferably, the milk cooler A is provided with double walls 17 and 18, and the spaces between said walls are filled with insulation 19. As indicated in Figures 2 and 3, a pump 20 having an inlet 21, is driven by an electric motor 22 mounted on the stand 23 supported on the side wall 24 of the cooler.

The pump draws water from the sump of the cooler and forces water up the pipe 25 to the fitting 26 and out each of the passageways 27 and 28. Each of the passageways is provided with a plurality of spaced perforations 29 and 30. The water issuing from these passageways engages the sloping walls of the container 7 and chills the exterior thereof. The chilled walls of the container cool the milk continuously as it passes into the tank through the milk conduits 12 and 13. One or more of said conduits 12 or 13 may be used according to the number of cows that are simultaneously milked.

The refrigerating unit is indicated at 31. This may be provided with conventional regulating means 32 for regulating the temperature of the refrigerant. The refrigerant passes downwardly by means of the pipe 33 to a series of combined baffle and heat exchange units 34 which are connected to each other as shown in Figures 2 and 3. The refrigerant then passes up through the return pipe 35 to the refrigerating unit 31.

It will be noted by reference to Figures 2 and 3 that the series of units 34 are located in staggered relationship so as to leave a serpentine passageway for the passage of water in the lower portion of the refrigerator, from the lower portion of the refrigerator in which is located the receptacle 7, to the pump 20.

By reference to Figure 3, it will be noted that three units 34 are affixed to inner refrigerator wall 36, and that the alternate units are attached to inner refrigerator wall 37, so as to provide for a more complete heat exchange between the comparatively warm water and the refrigerant in the several coils 34.

Figure 6:
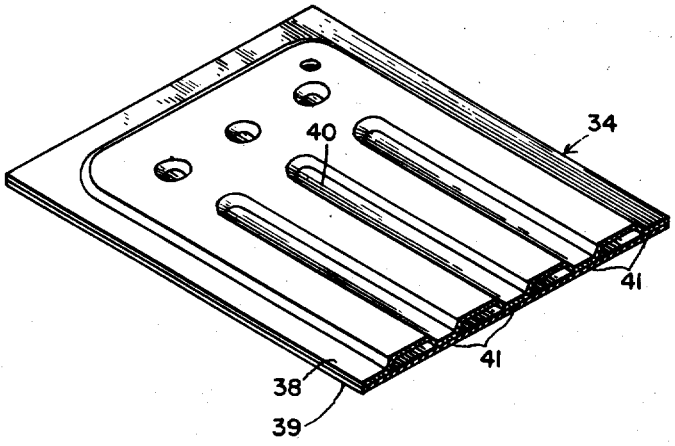
Figure 6 is a perspective view showing one of the combined heat exchange units and water baffles partly in section.

Referring to Figure 6 which shows a broken away perspective view of one of the units 34, each of said units is preferably constructed of a pair of zinc metallized plates 38 and 39. Portions 40 of the plate 38 have been forced inwardly and welded at 41 to the other plate 39. In this manner a comparatively thin heat exchange unit is provided having a maximum area for heat exchange purposes.

A drainage conduit 42 having a valve 43 from the receptacle is led through the floor portion of the cooler to an outlet (not shown). A second drainage conduit 65 having a valve 66 is for the purpose of draining water from the cooler A.

Each of the passageways 27 and 28 is preferably provided with a removable screw threaded closure 44 and 45 respectively as seen in Figure 3. These closures are engaged with screw threaded ends of the passageways (not shown). They may be removed for cleaning the passageways. The refrigerator is preferably provided with a removable top 46 that may have a conventional hinged or slidable mounting on the cooler body (not shown). Alternatively, side door means (not shown) may be provided as shown in Figure 1 of my Patent No. 2,512,094.

Briefly, the operation of the system is as follows: The animals are driven into their separate stalls and secured in the position shown in Figure 1. As soon as the pair of animals, or one of them, has been milked, another pair, or another of them, is driven onto the platforms, so that the operation is substantially continuous. The vacuum line applies suction to the milk lines, and as the milk enters the tank through the conduits 12 and 13, the sides of the tank are continuously chilled by the water issuing from the passageways 27 and 28. The water which has passed to the lower sides of the container moves over an ice bank which builds up around the lower sides of the container. The water is further chilled as it moves around the serpentine passageway defined by the series of cooling units 34. The temperature of the refrigerant in addition to being regulated by the means 32 shown in Figure 2, may also be further regulated by the thermostatic means 47 which is connected to the refrigerating unit by conventional wiring connections (not shown). This regulating means may be mounted on pipe 33 or in any suitable position. The purpose of these controls is to regulate the temperature within the cabinet and the temperature of the milk, so that the milk is maintained at a given temperature. These controls indicated by numerals 32 and 47 are thermostatic controls.

The pipe 55 which leads from the exterior of the cooler to adjacent the bottom of the milk receptacle has screw threads at the upper end thereof to which a cap 56 may be attached. When it is desired to empty the bulk receptacle, the cap is removed and a suction pipe of a milk tank truck, having suitable fittings, is attached to the pipe upper end. Suction from a pump on the truck is applied to pipe 55 and the bulk receptacle 7 in order to completely empty the said receptacle, after which the the pick-up truck proceeds to a creamery or other place of disposal. This system eliminates the use of the conventional milk cans.

I may remove the cover 9 and its conduits and use the neck portion of the receptacle as a pour-in opening although I perfer to employ the system heretofore described.

"Conduit means" in the claims includes the entire system of conduits leading into the receptacle, such as the conduit or conduits leading from the source of minus pressure, and the conduits 12 and 13 leading to the sets of teat cups.

In the form shown in Figure 5, the conduit means need not extend through the cover 9, but in this construction the milk conduits 48 and 49 and the vacuum conduit 50 extend through the top 46 directly into the milk receptacle 7.

Figure 7:
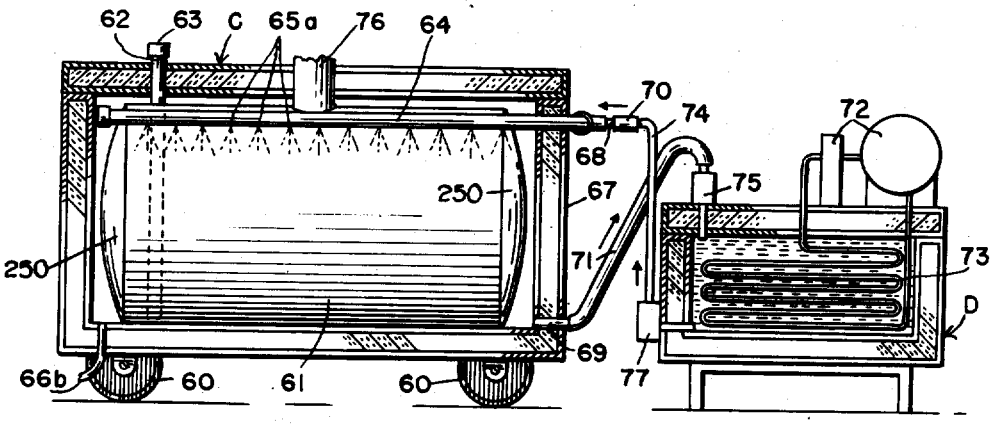
Figure 7 is a view partly in vertical section of another form of the invention.

In the modification disclosed in Figure 7, C is the milk cooler. The milk cooler is mounted on wheels 60, so that the milk cooler may be wheeled into the milk parlor, whereby it may take the place of the milk cooler A shown in Figure 1. After the tank has become filled with milk, it may be wheeled into a truck owned by the farmer and transported to the creamery or other place of disposal, the milk being removed from the tank 61 by means of the drainage conduit 62 having a cap or cover 63 which extends into the tank 61. This structure is similar to the structure indicated by the numerals 55 and 56 in Figure 2. One or more spray pipes 64 are located adjacent the upper inner portion of the cooler C, and these spray pipes are provided with a series of openings 65 for spraying a cooling liquid onto the exterior portion of the tank. The cooler is drained by a suitable pipe 66 that is closed by a valve (not shown). The pipes 64 extend through the side 67 of the cooler through an opening 68. Cooling water is drained from the cooler through the pipe 69. These pipes 64 and 69 have projecting ends to which are attached flexible conduits 70 and 71 respectively.

A second cabinet D is permanently mounted in the milking parlor 1 shown in Figure 1. This second cabinet is in the form of a tank having mounted on it the usual compressor-condenser indicated diagrammatically at 72, the cooling coils 73 of which are located in the cabinet D, as shown. These cooling coils chill the water which passes through the pipe 71 into the cabinet D, and the water, after having been chilled, passes upwardly through the conduit 74 into flexible conduit 70 and into pipe 64 from whence it passes outwardly through openings 65 to the exterior of tank 61. The warmed water in the lower portion of cooler C may be caused to pass upwardly through the pipe 71 by any suitable means, such as the pump 75, shown diagrammatically in the opening to the second cabinet.

It will be understood that the usual connections including the cover 9, shown in Figure 1, milk lines and vacuum lines 12, 13, and 16, shown in Figure 2, may be used on the opening 76 of cabinet C. Alternately, however, the pour-in arrangement shown in Figure 8 may be used with the structure shown in Figure 7.

In operation, the cooler C is wheeled into the milking parlor and the flexible conduits 70 and 71 are connected to the pumps 75 and 77, as shown in Figure 7. The milk is thoroughly chilled during the milking operation and is maintained at a low temperature, say 39° F. When it is desired to convey the milk in the cooler C to a creamery, the flexible conduits 70 and 71 are disconnected, and at this time, the ends of the pipes 64 and 69 to which said conduits have been attached, may be closed by suitable plugs (not shown). The cooler is then wheeled into a truck or it may be towed to a creamery or other point of disposal. It will be understood that the cool water remaining in the cooler 6 will serve to maintain the temperature of the milk in tank 61 sufficiently low during transportation of the tank to its point of destination.

Figure 8:
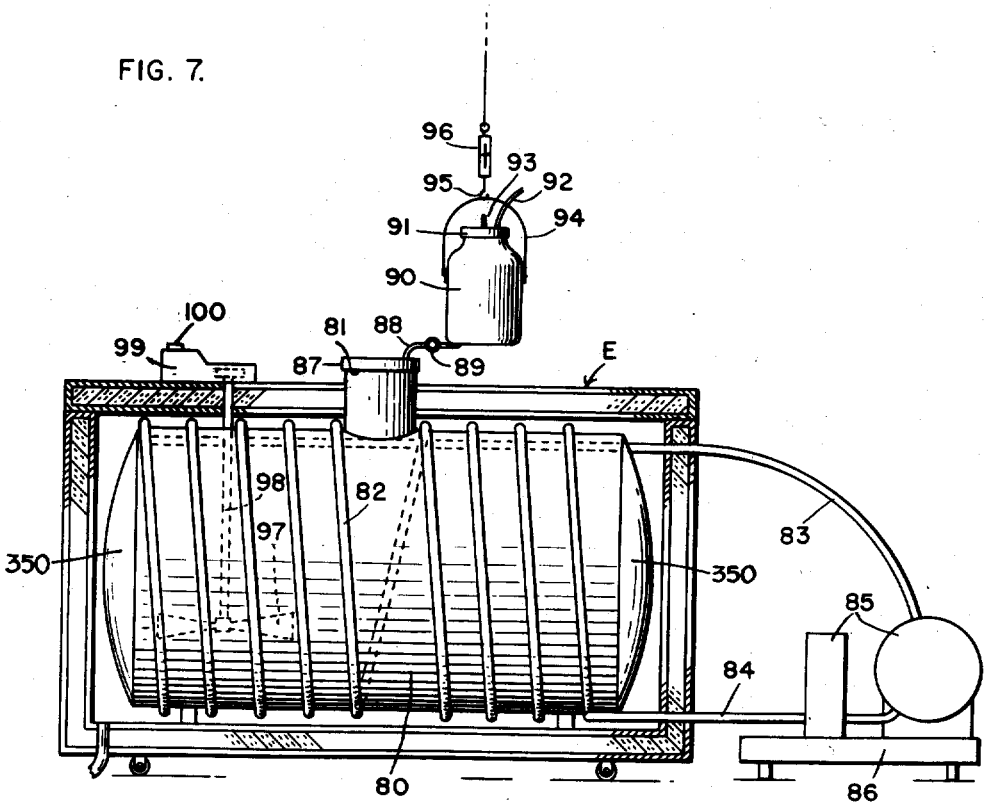
Figure 8 shows yet another form of the invention with some of the parts in vertical section.

In the structure shown in Figure 8, the milk cooler is indicated by the letter E. Located in the cooler is the tank 80. This tank is provided with an opening 81.

Extending entirely around the tank is a coil 82 having connecting conduits 83 and 84 leading to the compressor-condenser 85 mounted on the base 86. In this construction, both the cooler E and the base 86 which mounts the compressor-condenser are located in the milk parlor 1 shown in Figure 1, and these take the place of the structure shown at A in said figure. It will be understood that the connecting conduits 83, 84 may have detachable couplings (not shown). Additionally, the cooler E may be mounted on wheels similar to the wheels 60 shown in Figure 7.

The tank opening 81 may be provided with a cover and milk and vacuum pipes, such as shown in Figure 2, or the cover 87 may be substituted therefor. This cover is provided with a milk line 88 having a valve 89 leading to a weighing container 90. This container is provided with a sealed cover 91 through which extend a milk line 92 and a vaccum line 93. The container 90 may be provided with a bail 94 which is supported by a hook 95 of a weigher 96. This weigher may be supported from a suitable support (not shown).

The milk in the tank 80 may be continuously agitated by the agitator 97 having a shaft 98 which extends through vacuum seals (not shown) in the upper portion of the tank and cooler. This shaft extends into a gear box 99 having a suitable electric motor 100.

In Figures 2, 3 and 4 the numeral 150, in Figure 7 the numeral 250, and in Figure 8 the numeral 350 all indicate the ends of the milk cooler, which ends are semi-spherical in cross section.

Figure 9:
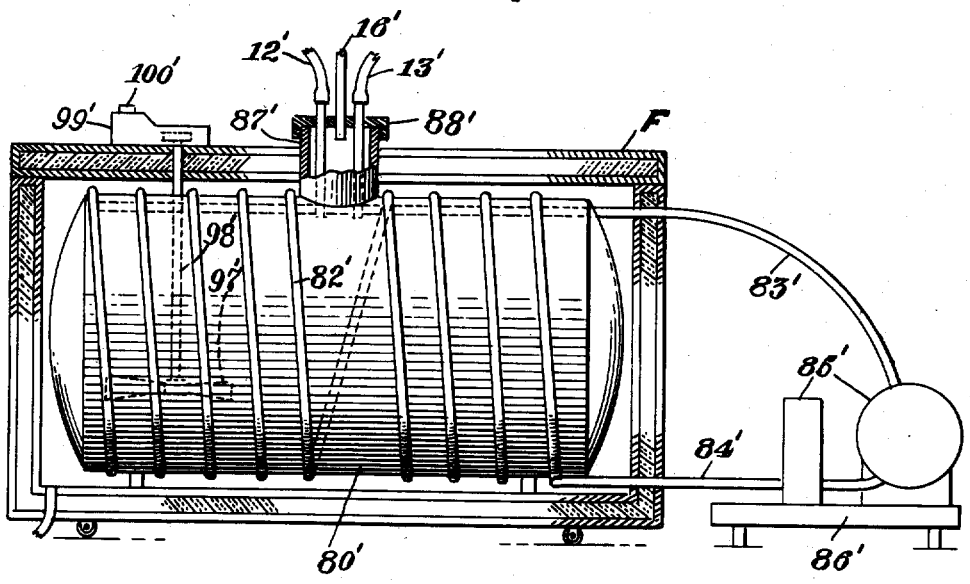
Figure 9 is a view similar to Figure 8 but showing vacuum and milk lines leading directly to the bulk milk receptacle.

The structure shown in Figure 9 is similar to that shown in Figure 8 except, as stated above, the milk lines and vacuum line are led directly to the interior of the bulk milk receptacle as shown in Figures 1 and 2.

In this structure, the milk cooler is indicated by the letter F. Located in the cooler is the tank 80'. Extending entirely around the tank is a coil 82' having connecting conduits 83' and 84' leading to the compressor-condenser 85' mounted on the base 86'. The bulk tank is provided with a neck 87'. Extending through cover 88' are the milk pipes 12' and 13' and the vacuum pipe 16'. A stirrer or agitator 97' is mounted on shaft 98' which extends through the casing and is driven by means of a gear box 99' having a suitable electric motor 100'.

It will be understood that upon actuation of an electric switch (not shown), the motor will be started, and this will drive the agitator 97 so as to continuously agitate the milk both during and following the milking operation.

The words "generally-cylindrical" in the claims includes other round sided bulk milk receptacles, such as oval-shaped, elliptical and other shaped sides, in order to distinguish from a bulk receptacle having square sides. The term "semi-spherical ends" designates ends which are partly spherical, preferably not half spherical. The dictionary definition of this term in its broadest sense is partly spherical, i. e. that in Funk and Wagnall's New Standard Dictionary 1929.

It will be further understood that this agitator and the driving means therefor may be used with any of the forms of the invention heretofore described.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is desired to be secured [for] *by* Letters Patent is:

1. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle during the milking operation.

2. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation.

3. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, and means for agitating the milk in said bulk milk receptacle.

4. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape, said first conduit means extending into the interior of said bulk milk receptacle and into said vacuum receptacle, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending through said milk cooler and into said bulk milk vacuum receptacle whereby to maintain a continuous vacuum in said bulk milk receptacle at least during the milking operation, and means for agitating the milk in said bulk milk receptacle.

5. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, said milk receptacle portion including a neck extending through the said milk cooler, a cover for said neck, said first conduit means and third conduit means extending through said cover.

6. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, said milk receptacle portion including a neck extending through the said milk cooler, a cover for said neck, said first conduit means and third conduit means extending through said cover.

7. In a system for milking a farm animal and for cooling and storing the milk in a bulk receptacle as it comes from the animal, comprising milking means and first conduit means, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, a separate container, said first conduit means extending through the interior of said separate container, means for cooling said receptacle during the milking operation including a refrigerating means and a second conduit means comprising a pipe leading therefrom and having a metallic portion thereof in heat exchange metal to metal contact with said receptacle, whereby the milk in said receptacle may be continuously cooled by the circulation of the refrigerant in said receptacle portion of said second conduit means at least during the milking operation, a third conduit means, said last named conduit means extending into said separate container, one of said conduit means including a conduit extending from said separate container through said portion of said milk cooler whereby to maintain a continuous vacuum in said bulk milk receptacle at least during the milking operation.

8. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, said metallic portion of said second conduit means comprising a spirally wound coil extending substantially the length of said bulk milk receptacle.

9. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, said metallic portion of said second conduit means comprising a spirally wound coil extending substantially the length of the said bulk milk receptacle.

10. In a system for milking a farm animal and for cooling and storing the milk in a bulk receptacle as it comes from the animal, comprising milking means and first conduit means, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, a separate container, said first conduit means extending through the interior of said separate container, means for cooling said receptacle during the milking operation including a refrigerating means and a second conduit means comprising a pipe leading therefrom and having a metallic portion thereof in heat exchange metal to metal contact with said receptacle, whereby the milk in said receptacle may be continuously cooled by the circulation of the refrigerant in said receptacle portion of said second conduit means at least during the milking operation, a third conduit means, said last named conduit means extending into said separate container, one of said conduit means including a conduit extending from said separate container through said portion of said milk cooler whereby to maintain a continuous vacuum in said bulk milk receptacle at least during the milking operation, and means for supporting said separate container including weighing means, and supporting means for said last named means.

11. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, said metallic portion of said second conduit means comprising a spirally wound coil extending substantially the length of the said bulk milk receptacle, and rotating agitating means including a motor and shaft mounted on said milk cooler, said shaft extending into said bulk milk receptacle and having an agitator on the end of said shaft.

12. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, and means supporting said refrigerating means exteriorly of and in spaced position from said milk cooler, said second conduit means further including a pipe extending from said refrigerating means into said milk cooler, said pipe being connected to said metallic portion of said conduit means.

13. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and a second conduit means leading therefrom and having a metallic portion thereof in heat exchange metal to metal contact with said receptacle, whereby the milk in said receptacle may be continuously cooled by the circulation of the refrigerant in said metallic portion of said second conduit means at least during the milking operation, and a third conduit means, said third conduit means extending into said receptacle through said receptacle portion whereby to maintain a continuous vacuum in said bulk milk receptacle at least during the milking operation, and means supporting said refrigerating means exteriorly of and in spaced position from said milk cooler, said second conduit means further including a pipe extending from said refrigerating means into said milk cooler, said pipe being connected to said metallic portion of said conduit means.

14. In a system for milking a farm animal and for cooling and storing the milk in a bulk receptacle as it comes from the animal, comprising milking means including teat cup means and first conduit means extending therefrom, a milk cooler having insulating walls, a bulk milk metallic vacuum receptacle in said cooler, said bulk milk receptacle being generally cylindrical with ends which are semi-spherical in shape, said bulk milk receptacle having means connected thereto and to said first conduit means, said receptacle also having means adapted to be connected to a source of vacuum whereby to apply said vacuum to said receptacle and to said teat cup means, means for cooling said receptacle during the milking operation including a refrigerating means and a conduit means leading therefrom and having a metallic portion thereof in heat exchange metal to metal contact with said receptacle, whereby the milk in said receptacle may be continuously cooled by the circulation of the refrigerant in said metallic portion of said conduit means at least during the milking operation.

15. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are curved in any cross section on a single radius, and having a portion extending through a top wall of said cooler, said first conduit means extending into the interior of said bulk milk receptacle through said portion, means for cooling said receptacle during the milking operation including a refrigerating means and a second conduit means leading therefrom and having a heat exchange portion thereof in heat exchange contact with said receptacle, whereby the milk in said receptacle may be continuously cooled by the circulation of the refrigerant in said heat exchange portion of said second conduit means at least during the milking operation, and a third conduit means, said third conduit means extending into said receptacle through said receptacle portion whereby to maintain a continuous vacuum in said bulk milk receptacle at least during the milking operation.

16. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are curved outwardly in any cross section, and having a portion extending through a top wall of said cooler, said first conduit means extending into the interior of said bulk milk receptacle through said portion, means for cooling said receptacle during the milking operation including a refrigerating means and a second conduit means leading therefrom and having a heat exchange portion thereof in heat exchange contact with said receptacle, whereby the milk in said receptacle may be continuously cooled by the circulation of the refrigerant in said heat exchange portion of said second conduit means at least during the milking operation, and a third conduit means, said third conduit means extending into said receptacle through said receptacle portion whereby to maintain a continuous vacuum in said bulk milk receptacle at least during the milking operation.

*17. A system for milking a farm animal and delivering the milk as it comes from the animal into a cooled bulk receptacle, comprising a milking means, a milk cooling means having insulating substantially surrounding walls, a single integral metal milk receptacle permanently fixed in said cooling means and occupying a substantial part of the interior space thereof, said milk receptacle being of substantially cylindrical form and having milk and vacuum lines operatively connected to said receptacle, means for cooling said receptacle during the milking operation including a refrigerating means and a conduit means leading therefrom and having a metallic portion thereof in heat exchange metal to metal contact with said receptacle, whereby the milk in said receptacle may be continuously cooled by the circulation of the refrigerant in said metallic portion of said conduit means at least during the milking operation.*

*18. A system for milking a farm animal and delivering the milk as it comes from the animal into a cooled bulk receptacle, comprising a milking means, a milk cooling means having insulating substantially surrounding walls, a single integral metal milk receptacle permanently fixed in said cooling means and occupying a substantial part of the interior space thereof, said milk receptacle being of substantially cylindrical form and having milk and vacuum lines operatively connected to said receptacle, means for cooling said receptacle during the milking operation including a refrigerating means and a conduit means leading therefrom and having a metallic portion thereof in heat exchange metal to metal contact with said receptacle, whereby the milk in said receptacle may be continuously cooled by the circulation of the refrigerant in said metallic portion of said conduit means at least during the milking operation, said refrigerating means including a base located exteriorly of said insulated milk cooling means, a compressor-condenser forming part of said refrigerating means mounted on said base, said conduit means being connected to said compressor-condenser.*

References Cited in the file of this patent or the original patent

UNITED STATES PATENTS

| | | |
|---|---|---|
| 778,227 | Devore | Dec. 27, 1904 |
| 1,925,877 | Mitchum | Sept. 5, 1933 |
| 1,929,709 | Neeley | Oct. 10, 1933 |
| 2,024,639 | Greene | Dec. 17, 1935 |
| 2,249,051 | Schulse | July 15, 1941 |
| 2,266,134 | Wachowitz | Dec. 16, 1941 |
| 2,320,531 | Mojonnier | June 1, 1943 |
| 2,343,717 | Turnau | Mar. 7, 1944 |
| 2,498,401 | Duncan | Feb. 21, 1950 |
| 2,509,214 | Cordis | May 30, 1950 |
| 2,512,094 | Duncan | June 20, 1950 |
| 2,557,252 | Bannister et al. | June 19, 1951 |
| 2,576,050 | Soden | Nov. 20, 1951 |
| 2,594,603 | Zamboni | Apr. 29, 1952 |
| 2,616,809 | Graves | Nov. 4, 1952 |
| 2,617,264 | McGovern et al. | Nov. 11, 1952 |
| 2,617,382 | Duncan | Nov. 11, 1952 |
| 2,631,566 | Roop | Mar. 17, 1953 |

FOREIGN PATENTS

| | | |
|---|---|---|
| 14,887 | Great Britain | 1908 |
| 963,212 | France | Dec. 26, 1949 |

OTHER REFERENCES

Byvac Publication, 1941.

De Laval Model F. Combined Milking System, November 14, 1950.